US011774734B2

(12) United States Patent
Visser et al.

(10) Patent No.: US 11,774,734 B2
(45) Date of Patent: Oct. 3, 2023

(54) FOCAL IN-FIELD POINTING TELESCOPE SYSTEM

(71) Applicant: Nederlandse Organisatie voor toegepast-natuurwetenschappelijk onderzoek TNO, 's-Gravenhage (NL)

(72) Inventors: Huibert Visser, Rotterdam (NL); Hedser Van Brug, The Hague (NL)

(73) Assignee: Nederlandse Organisatie voor toegepast-natuurwetenschappelijk onderzoek TNO, 's-Gravenhage (NL)

(*) Notice: Subject to any disclaimer, the term of this patent is extended or adjusted under 35 U.S.C. 154(b) by 175 days.

(21) Appl. No.: 17/255,314

(22) PCT Filed: Jun. 26, 2019

(86) PCT No.: PCT/NL2019/050390
§ 371 (c)(1),
(2) Date: Dec. 22, 2020

(87) PCT Pub. No.: WO2020/005060
PCT Pub. Date: Jan. 2, 2020

(65) Prior Publication Data
US 2021/0263292 A1    Aug. 26, 2021

(30) Foreign Application Priority Data
Jun. 27, 2018    (EP) .................................... 18180206

(51) Int. Cl.
G02B 17/06    (2006.01)
G02B 23/06    (2006.01)
(Continued)

(52) U.S. Cl.
CPC ......... *G02B 17/0642* (2013.01); *G02B 23/06* (2013.01); *G02B 23/2407* (2013.01); *G02B 26/0816* (2013.01)

(58) Field of Classification Search
CPC .................. G02B 23/06; G02B 26/0816–0866
See application file for complete search history.

(56) References Cited

U.S. PATENT DOCUMENTS 4,804,258 A    2/1989  Kebo
5,905,591 A    5/1999  Duncan
(Continued)

FOREIGN PATENT DOCUMENTS

CN    101158746 A  *  4/2008
CN    102736237 A  *  10/2012
(Continued)

OTHER PUBLICATIONS

European Patent Office, International Search Report in corresponding International Application No. PCT/NL2019/050390, dated Sep. 23, 2019 (2 pages).

*Primary Examiner* — Christopher Stanford
(74) *Attorney, Agent, or Firm* — Leydig, Voit & Mayer, Ltd.

(57) ABSTRACT

A telescope system (100) comprises a steering minor (M5) arranged in a part of its optical path (L5-L6) between a first telescope stage (10) and a second telescope stage (20). The steering mirror (M5) is configured to controllably rotate over a rotation angle (θm) for controlling a view angle (θv) of the telescope system (100) from the entrance aperture (A1). The steering mirror (M5) is disposed at an intermediate pupil (Pi) of the telescope system (100), at which position an image of the aperture stop (As) is formed by one or more of the optical components (M7, M6) there between.

15 Claims, 3 Drawing Sheets

(51) Int. Cl.
*G02B 23/24* (2006.01)
*G02B 26/08* (2006.01)

(56) References Cited

U.S. PATENT DOCUMENTS

| | | | |
|---|---|---|---|
| 6,819,483 B1 | 11/2004 | Sigler et al. | |
| 7,385,759 B2 | 6/2008 | Pasternak et al. | |
| 9,305,378 B1 * | 4/2016 | Holmes | G02B 23/06 |
| 9,482,853 B2 * | 11/2016 | Sitter, Jr. | G01S 3/781 |
| 10,001,636 B2 * | 6/2018 | Sitter, Jr. | G02B 13/08 |
| 2005/0013021 A1 | 1/2005 | Takahashi et al. | |

FOREIGN PATENT DOCUMENTS

| | | | | |
|---|---|---|---|---|
| CN | 106371200 A * | 2/2017 | | G02B 17/0626 |
| FR | 2678742 A1 | 1/1993 | | |
| FR | 3119682 A1 * | 8/2022 | | |
| JP | 2006-113248 A | 4/2006 | | |
| WO | WO 2017/058336 A1 | 4/2017 | | |

* cited by examiner

FOCAL IN-FIELD POINTING TELESCOPE SYSTEM

CROSS-REFERENCE TO RELATED APPLICATIONS

This patent application is a U.S. National Phase of PCT International Application No. PCT/NL2019/050390, filed Jun. 26, 2019, which claims priority to European Application No. 18180206.7, filed Jun. 27, 2018, which are both expressly incorporated by reference in their entireties, including any references contained therein.

TECHNICAL FIELD AND BACKGROUND

The present disclosure relates to a pointing telescope system, e.g. suitable for directing beams between high precision optical systems over long distances.

For example, the Laser Interferometer Space Antenna (LISA) is a European Space Agency mission designed to detect and accurately measure gravitational waves—tiny ripples in the fabric of space-time—from astronomical sources. It is planned to be the first dedicated space-based gravitational wave detector and aims to measure gravitational waves directly by using laser interferometry. The LISA concept features a constellation of three spacecraft, arranged in an equilateral triangle with sides 2.5 million km long, flying along an Earth-like heliocentric orbit. The distance between the satellites is to be precisely monitored to detect a passing gravitational wave. LISA will observe gravitational waves by measuring differential changes in the length of its arms, as sensed by laser interferometry. Each of the three LISA spacecrafts contains two telescopes, two lasers and two test masses (roughly two kilogram), arranged in two optical assemblies pointed at the other two spacecrafts. These may form Michelson-like interferometers, each centered on one of the spacecraft, with the test masses defining the ends of the arms. To eliminate non-gravitational forces such as light pressure and solar wind on the test masses, each spacecraft may be constructed as a zero-drag satellite, and effectively floats around the masses, using capacitive sensing to determine their position relative to the spacecraft, and precise thrusters to keep itself centered around them.

As described by Livas et al. [*IOP Conf. Series: Journal of Physics: Conf. Series* 840 (2017) 012015; doi:10.1088/1742-6596/840/1/012015], orbital motion of the three spacecraft that make up the constellation are expected to cause long-arm line of sight variations of approximately plus-minus one degree over the course of a year. To correct for this, the baseline solution is to package the telescope, the optical bench, and the gravitational reference sensor (GRS) into an optical assembly at each end of the measurement arm, and then to articulate the whole assembly. An optical phase reference is exchanged between the moving optical benches with a single mode optical fiber ("backlink" fiber). However, moving the relatively large assembly may be impractical, especially in a satellite. In an alternative solution, referred to as in-field pointing, it is envisaged to embed a steering mirror into the optical design, fixing the optical benches and eliminating the backlink fiber. However, this may introduce additional complication of a two-stage optical design for the telescope.

There is yet a need for an improved telescope system, e.g. allowing a variable view angle while maintaining minimal distortions and keeping the telescope optically coupled to back-end optical devices.

SUMMARY

Aspects of the present disclosure provide a pointing telescope system and optical system comprising the telescope system. A telescope system typically comprises an entrance aperture for letting light into the telescope system at an entrance side of the telescope system, and an exit aperture for letting the light out of the telescope system at an exit side of the telescope system. Light may also travel both directions through the telescope system. Optical components such as mirrors and/or lenses may be configured to shape and guide the light along an optical path inside the telescope system between and through the respective entrance and exit apertures.

Preferably, the optical path of the present telescope system is divided in multiple stages comprising respective subsets of the optical components. For example, a first part of the optical path may be determined by a first subset of the optical components forming a first telescope stage of the telescope system and a second part of the optical path may be determined by a second subset of the optical components forming a second telescope stage of the telescope system. A steering mirror can be arranged in a part of the optical path between the first telescope stage and the second telescope stage. For example, the steering mirror may be configured to controllably rotate over a rotation angle for controlling a view angle of the telescope system from the entrance aperture.

Most preferably, the steering mirror is disposed at an intermediate pupil of the telescope system, i.e. at a position where an image of the aperture stop is formed by one or more of the optical components. Placing the steering mirror at an intermediate pupil of the telescope system may have an effect that rotation of the mirror minimally affects light passing the aperture stop, e.g. because the light is reimaged there. Also, the other way, various angles of light passing the aperture stop may come together on the steering mirror.

By using the exit aperture as the aperture stop, a light beam rotated by the steering mirror may remain its position on the exit aperture. For example, the optical components of the second telescope stage may be configured to image the exit aperture onto the steering mirror. By alternatively, or additionally, configuring the optical components of the first telescope stage to image the (virtual) entrance pupil on the steering mirror, the telescope may view in different directions without affecting the viewpoint origin. For example, a virtual entrance pupil can be overlaid on a desired viewpoint origin such as a test mass.

By using afocal optical configurations for one or more, preferably all of the telescope stages, the beam can maintain its collimation between the stages. Collimated beams, particularly on the steering mirror, may be easier to control, e.g. may be less affected by slight variation of direction or path length between optical stages. Furthermore, to minimize distortions, particularly while allowing a change in beam directions, the inventors find particular advantage in a configuration where optical components making up the telescope stages are parabolic mirrors placed in pairs with overlapping optical axes and focal points, each pair decreasing the beam size, while at least the mirrors in the first telescope stage have balanced focal power.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
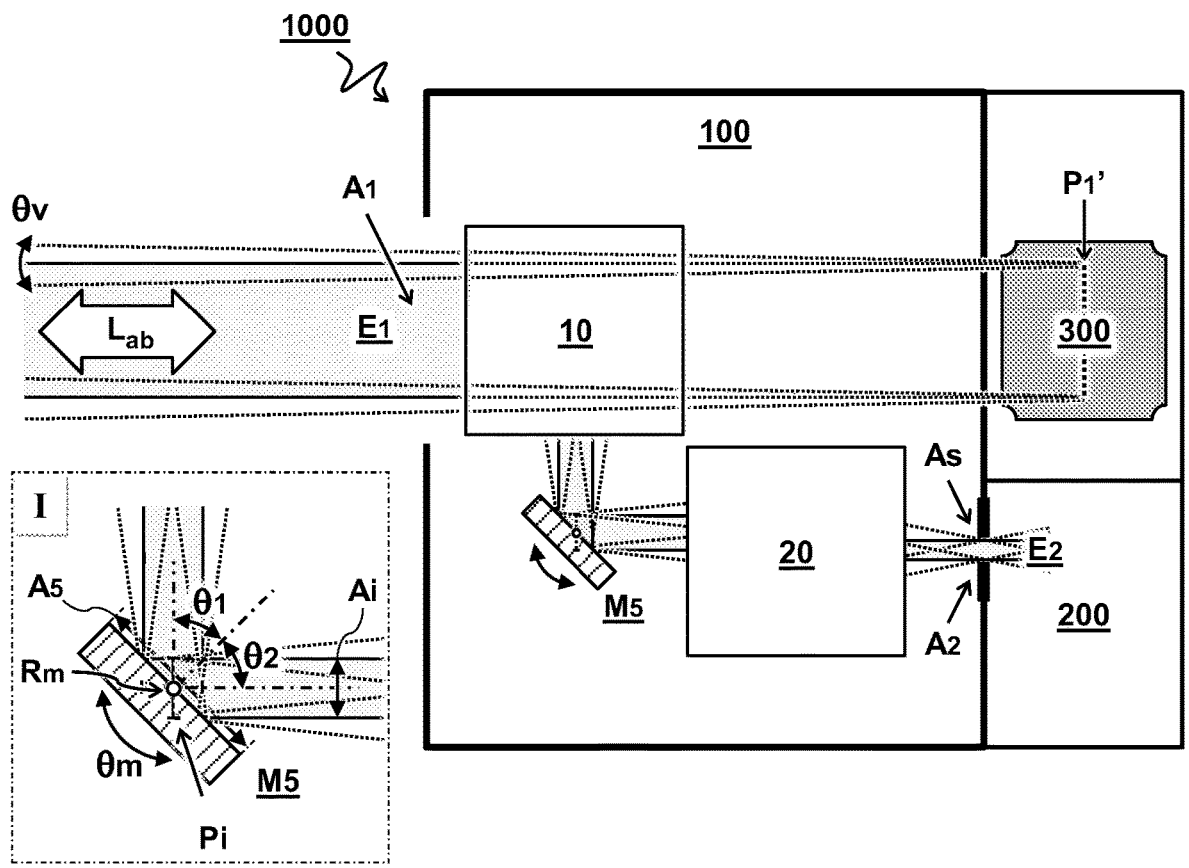
FIG. 1A schematically illustrates a telescope system as part of a larger optical system.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

Typically, a telescope system has an aperture stop determined by a minimum physical opening limiting light passing between and through the entrance and exit apertures of the telescope system via the optical components along the optical path. For example, the aperture stop can be determined by a physical aperture or opening along the optical path, which may include one of the entrance aperture, exit aperture, or intermediate aperture. Alternatively, limited dimensions of optical elements such as mirrors or lenses can determine the aperture stop.

A pupil may be described as an image of the aperture stop. Reference can also be made to a pupil plane which can be described as an image plane where the aperture stop is at the object plane for one or more optical components. The position and extent of a pupil can be determined by the position and extent of the aperture stop as well as optical components which can form an image of the aperture stop along the optical path. When the image is not actually formed along the optical path, this may be referred to as a virtual image or virtual pupil.

A telescope system typically has an entrance pupil which can be described as an image of the aperture stop as seen from an entrance side of the telescope system, also referred to as the object side. In other words, the entrance pupil may be described as an image of the aperture stop as seen from an axial point on the object, i.e. through the optical elements of the system which precede the aperture stop. In case there are no optical components between the aperture stop and the telescope entrance, e.g. the entrance aperture forms the aperture stop, the entrance pupil may be defined as coinciding with the entrance aperture. The entrance pupil can be a virtual image where the image is not actually formed along the optical path. This is also referred to as a virtual entrance pupil. Typically, the virtual entrance pupil lies behind the first optical surface of the system.

A telescope system typically has an exit pupil defined as an image of the aperture stop as seen from an exit side of the telescope system, also referred to as the image side. In other words, the exit pupil may be defined as the image of the aperture stop as seen from an axial point in the image plane i.e. through the optical elements of the system behind the aperture stop. In case there are no optical components between the aperture stop and the telescope exit, e.g. the exit aperture forms the aperture stop, the exit pupil may be defined as coinciding with the exit aperture.

As used herein, a telescope system can have an intermediate pupil which can be described as an image of the aperture stop between the entrance pupil and the exit pupil. For example, an intermediate pupil plane can be disposed at one or more positions along the optical path where the aperture stop is imaged or reimaged by one or more optical components between the aperture stop and intermediate pupil. When the intermediate pupil forms a real image, an optical component such as a steering mirror can be placed there so the image of the aperture stop falls on the component.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1A schematically illustrates part of an optical system 1000 comprising a pointing telescope system 100 between an incoming/outgoing beam of light and an optional back-end optical device 200.

Typically, a telescope system 100 comprises an entrance aperture A1 for admitting light into the telescope system 100 at an entrance side E1 of the telescope system 100. Typically, the telescope system 100 comprises an exit aperture A2 for allowing the light to pass out of the telescope system 100 at an exit side E2 of the telescope system 100. In some embodiments, the entrance aperture A1 forms an exclusive opening between the telescope system 100 and the external surroundings. For example, the optical components of the telescope system 100 are enclosed by a housing being preferably closed off except for the entrance aperture A1 and possibly the exit aperture A2 which may lead to the back-end optical device 200.

For convenience, the first aperture at the object or external side E1 of the telescope system 100 is referred herein as the entrance aperture A1 and the second aperture on the image or back-end side E2 of the telescope system 100 is referred herein as the exit aperture A2. It will be understood that light may also travel the other direction so in effect the second aperture may become the entrance and the first aperture may become the exit. Similarly, the designation of the entrance pupil and exit pupil may be reversed in some embodiments. As used herein, the entrance pupil is typically the pupil or image of the aperture stop As through the aperture A1 on the external entrance side E1, and the exit pupil is the pupil or image of the aperture stop at the back-end side E2. Light may also travel in both directions consecutively or simultaneously, e.g. using a polarizer and/or semi transparent mirror.

Typically, a telescope system 100 comprises optical components such as mirrors or lenses configured to shape and guide the light along an optical path inside the system between and through the respective entrance and exit apertures A1, A2. For example, a telescope system, typically has a magnification or de-magnification factor where the incoming beam is enlarged or diminished by the optical components before exiting the telescope system.

In a preferred embodiment, a steering mirror M5 is arranged in a part of the optical path between a first telescope stage 10 and the second telescope stage 20. The steering mirror M5 may be configured to controllably rotate over a rotation angle θm for controlling a view angle θv of the telescope system 100 from the entrance aperture A1. In further preferred embodiment, the steering mirror M5 is disposed at an intermediate pupil Pi of the telescope system 100. The intermediate pupil Pi is at a position where an image of the aperture stop As is formed by one or more of the optical components there between.

In a preferred embodiment, the telescope system 100 is an afocal system. An afocal system produces no net convergence or divergence of the incoming beam, i.e. has an infinite effective focal length. Accordingly, the telescope system may be configured to e.g. receive a collimated beam of light and output a collimated beam of light, e.g. suitable for the back-end optical device 200. Collimated beams of light typically have a flat wavefront and may be particularly suitable for sending over large distances.

In one embodiment, the back-end optical device 200 comprises a light sensor (not shown) for detecting light including an incoming light beam traversing the telescope system 100 between the apertures A1 and A2. Alternatively, or in addition to detecting the incoming light at a sensor, the light beam traversing the telescope system 100 may be combined with itself or another light beam, e.g. in an interferometer (not shown). Also other or further optical devices for processing or shaping the light can be used. The other light beam may also have an external origin, e.g. traverse the same telescope system 100, or a second telescope system (not shown). The other light beam may also be internally generated.

In some embodiments, the back-end optical device 200 comprises a light source (not shown) to generate a light beam e.g. to combine with an external light beam and/or for traversing the telescope system 100 in the other direction, i.e. being sent out via the exit aperture A2 and from entrance aperture A1. For example, the light source comprises a laser. In some embodiments, the light source, is configured to generate a collimated beam of light.

Most preferably, the first telescope stage 10 and the second telescope stage 20 are both afocal systems. Accordingly, the first telescope stage 10 and the second telescope stage 20 may be configured to maintain collimation of the incoming light beam from the entrance aperture A1 not only in the outgoing beam at the exit aperture A2, but also there between, in particular at the intermediate pupil Pi. Accordingly, light beam reflected by the steering mirror M5 there between may also be collimated. This can have an advantage that any path length variation which may be caused by rotation of the mirror have minimal effect on the collimation or size of the beam further on in the optical path.

In a preferred embodiment, optical components of the second telescope stage 20 are configured to image the (virtual or real) exit pupil P2 onto the steering mirror M5. Additionally, or alternatively, optical components of first telescope stage 10 may be configured to image the (virtual or real) entrance pupil P1' onto the steering mirror M5. Advantageously, the telescope may be arranged to view in different directions with minimal or no displacement of the light beam on the steering mirror M5 and/or aperture stop As.

In some embodiments, the aperture stop coincides with a physical aperture of the telescope system 100. Most preferably, the aperture stop As of the telescope system 100 is determined by its exit aperture A2. In other words, the exit aperture A2 may form the aperture stop As and the exit pupil of the telescope system 100 may coincide with the exit aperture A2. This can have an advantage that the light may exit the telescope system 100 at a specific position being minimally dependent on a rotation of the steering mirror M5. Accordingly, the back-end optical device 200, e.g. comprising an interferometer (not shown), can easily accept the light beam exiting from the telescope system 100. Conversely, light may pass the other way, i.e. into the aperture stop or 'exit' aperture A2, possibly acting also as entry for the telescope system 100 for light from the back-end optical device 200. Also in this case the light may arrive at the steering mirror M5 minimally affected by a direction of the light through the aperture stop As. In another embodiment (not shown), the aperture stop can be formed elsewhere along the optical path, e.g. the entrance aperture A1 or another aperture along the path (not shown). Also an optical component such as a limited size mirror or lens may form the aperture stop (not shown).

With reference now to the inset "I" of FIG. 1A, further details with regards to the steering mirror M5 are illustrated according to some embodiments. The inset shows how an incoming beam from the first telescope stage 10 hits the steering mirror M5 with incidence angle θ1 and is reflected by the steering mirror M5 at corresponding reflection angle θ2 towards the second telescope stage 20. Generally, the incidence angle θ1 and the reflection angle θ2 are measured with respect to the surface normal of the reflective surface of the steering mirror M5 and are typically equal but opposite. Furthermore, it will be understood that the light beam may also travel the opposite direction for some embodiments.

It may be noted that the image plane of the aperture stop As, i.e. intermediate pupil Pi, can be at an angle with respect to a mirror surface of the steering mirror M5. While the effect may be minor in some embodiments, for further precision it can be preferred to keep the angle with the pupil plane as small as possible or practical. In principle various angles of incidence and reflection may be used, e.g. between ten and eighty degrees. However, to have the intermediate pupil Pi as much as possible disposed on the mirror surface, it can be preferable in some embodiments that the steering mirror M5 is configured to provide incidence and reflection angles θ1, θ2 with respect to the optical path within a certain limit, e.g. less than sixty degrees (plane angle), preferably less than fifty degrees, more preferably less than forty degrees, most less than thirty degrees. On the other hand it may be practical to have a certain minimum angle of incidence, e.g. more than five, ten or fifteen degrees, so the reflected light beam can be spatially separated from the incident light beam, optionally by inserting another folding mirror (not shown) to direct the beam from the steering mirror M5 to the next telescope stage.

It will be understood that when the steering mirror M5 rotates, the angle of incidence/reflection may change. This may cause the beam to shift position on various optical components in the respective telescope stage, with exception of the pupil planes, e.g. at the aperture stop As which may be the exit pupil P2 or exit aperture A2 and/or the (virtual) entrance pupil P1'. To stay within an acceptable angles, preferably the steering mirror M5 is configured to allow a rotation angle θm over a limited range of, e.g. plus-minus ten degrees, plus-minus five degrees, plus-minus three degrees, or less, e.g. plus-minus one degree. It will be noted that the rotation angle θm of the steering mirror M5 is not necessarily the same as the corresponding change of view angle θv. For example, magnification or de-magnification of the first telescope stage 10 may affect the relative change in view angle θv compared to the rotation angle θm.

In a preferred embodiment, the first telescope stage 10 is configured to de-magnify a collimated light beam from the entrance aperture A1 to the steering mirror M5 (or magnify in the other direction) by at least a factor two, three, or more, e.g. between five and ten. In this case, the change in view angle θv may actually be smaller than the rotation angle θm of the steering mirror M5, whereas the change in angle off a reflecting mirror is normally twice the angle of rotation. For example, in an embodiment where the first telescope stage 10 has a de-magnification factor five (or magnification factor five the other direction), moving the steering mirror M5 plus-minus two-and-half degree, may move the view angle plus-minus one degree. So the steering mirror M5 may actually provide relatively high precision in changing of the view angle θv compared to the precision at which it is rotated. Of course also other magnifications and relative angles may be used.

With continued reference to the inset image, it may be noted that the projection of the intermediate pupil Pi may intersect at some point with the mirror plane of the steering mirror M5. In a preferred embodiment, at least a part of the intermediate pupil Pi coincides with a rotational axis Rm of the steering mirror M5. More preferably, a center of the intermediate pupil Pi coincides with a rotational axis Rm of the steering mirror M5. In other words, the mirror is arrange to rotate around the rotational Rm axis which coincides with the projected image of the aperture stop As. In this way the reflected beam may still appear to originate from the intermediate pupil Pi also when it is rotated. In another preferred embodiment, at least some part of the intermediate pupil Pi coincides with front reflection surface the steering mirror M5. More preferably, the center of the intermediate pupil Pi coincides with a front reflection surface the steering mirror M5. Most preferably, the steering mirror M5 is configured to rotate around an axis through its front mirror surface which axis coincides with a center or at least a center line of the intermediate pupil Pi. In this way, the beam may experience minimal shift on the mirror, especially in combination with a relatively low angle of incidence/reflection.

In some embodiments, the steering mirror M5 is configured to rotate over more than one rotation axis, e.g. two perpendicular rotation axes to control XY positioning or view angle θv in multiple directions. In that case similar preferences may exist for the second rotational axis (not shown). For example, it would be preferred that the center of the intermediate pupil Pi also coincides with the second rotational axis of the steering mirror M5. For example, it would be preferred that the center of the intermediate pupil Pi would also coincide with the front reflection surface the steering mirror M5. Alternatively, or in addition, a second or further steering mirror (not shown) can be used. It is then preferred that the second or further steering mirror is placed in a second intermediate pupil plane (not shown), most preferably with similar considerations as the first steering mirror. For example, it would be preferred that a center of the second intermediate pupil coincides with a rotational axis of the second steering mirror and/or that the center of the second intermediate pupil coincides with a front reflection surface the second steering mirror. Also combinations are possible with one, two, or more steering mirrors rotating in respective pupil planes around respective one, two, or more rotational axes.

With continued reference to the inset image, it may be noted that the collimated beam incident and reflected at the steering mirror M5 may have a certain beam width corresponding to a projected width of the aperture stop As, i.e. intermediate pupil diameter Ai. For example, this may be determined by the size of the exit aperture A2 and the magnification factor of the second telescope stage 20. Preferably, the reflected beam is not clipped by a diameter A5 of the steering mirror M5. So the mirror diameter A5 of the steering mirror M5 may be larger than the projected beam width or intermediate pupil diameter Ai. Furthermore, it will be noted that a larger steering mirror M5 may be needed if the beam is incident/reflected at relatively large angles. For example, the diameter A5 of the steering mirror M5 is preferably at least a diameter Ai of the intermediate pupil Pi divided by cosine of the maximum allowed incidence/reflection angle θ1, θ2.

With reference now to the top right part of FIG. 1A, it is illustrated that in some preferred embodiments, the telescope system 100 can have a virtual entrance pupil P1' wherein a first mirror M1 of the first telescope stage 10 is (directly) between the entrance aperture A1 and the virtual entrance pupil P1'. In some applications, it can be desired to overlap the virtual entrance pupil P1' with a predetermined point of origin or destination. For example, in an application of the telescope system 100 as discussed in the background section and illustrated in FIG. 1A, it can be desired to overlap the virtual entrance pupil P1' with a test mass 300 of the spacecraft. In this way incoming and outgoing beams of light may appear to be directed towards and from the test mass 300 even when the view angle θv and position at the entrance aperture A1 changes. Also other applications may benefit from a virtual entrance pupil coinciding with a specific position in the system.

Figure 1B:
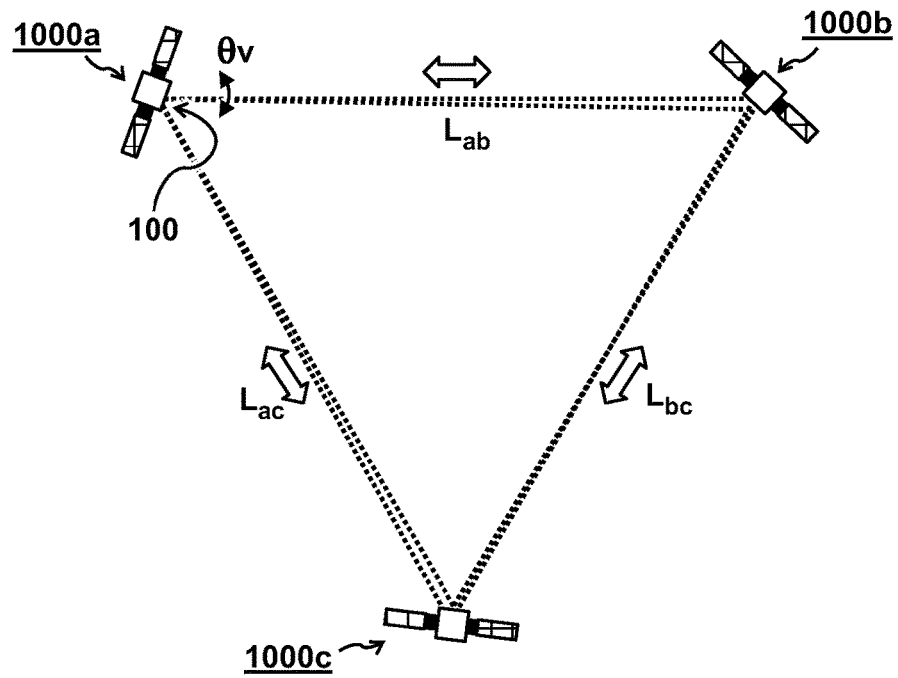
FIG. 1B schematically illustrates a constellation of satellites with optical systems.

FIG. 1B schematically illustrates a constellation of satellites comprising respective optical systems 1000a, 1000b, 1000c communicating with light beams Lab, Lac, Lbc there between. In some embodiments, each optical system may comprise two or more of the same or similar telescope system as described herein, each looking in a respective direction to connect a light beam with another optical system. While the embodiment shows a constellation with three satellites, also two satellites, or more than three satellites can be used for other applications. While the telescope system as described herein is particularly suitable as part of an optical system such as a spacecraft or satellite sending light beams over great distances, also other applications can be envisaged, e.g. communication with light beams between a satellite and ground station, or vice versa. Also communication with other flying or otherwise mobile devices can be envisage. Also communication between a ground stations can be envisaged, e.g. compensating for atmospheric conditions by subtle rotation of the view angle.

In some embodiments, an optical system may comprise a controller (not shown) configured to control one or more steering mirrors of a telescope system 100 as described herein to change the view angle θv of the telescope system 100 to receive or transmit the light beams to another optical system. For example, light beams can be exchanged between a first optical system 1000a and a second optical system 1000b as shown, or otherwise. In some embodiments, the optical system may comprise a back-end optical device 200 comprising an interferometer configured to interferometrically measure light beams traversing the telescope system 100. In some embodiments, the telescope system 100 as described herein is applied in one or more optical systems 1000a, 1000b, 1000c for gravitational wave measurement, e.g. in one or more space crafts as shown or otherwise. In other or further embodiments, the optical system may comprise a reference mass 300 preferably disposed at a virtual entrance pupil P1' of the telescope.

Figure 2:
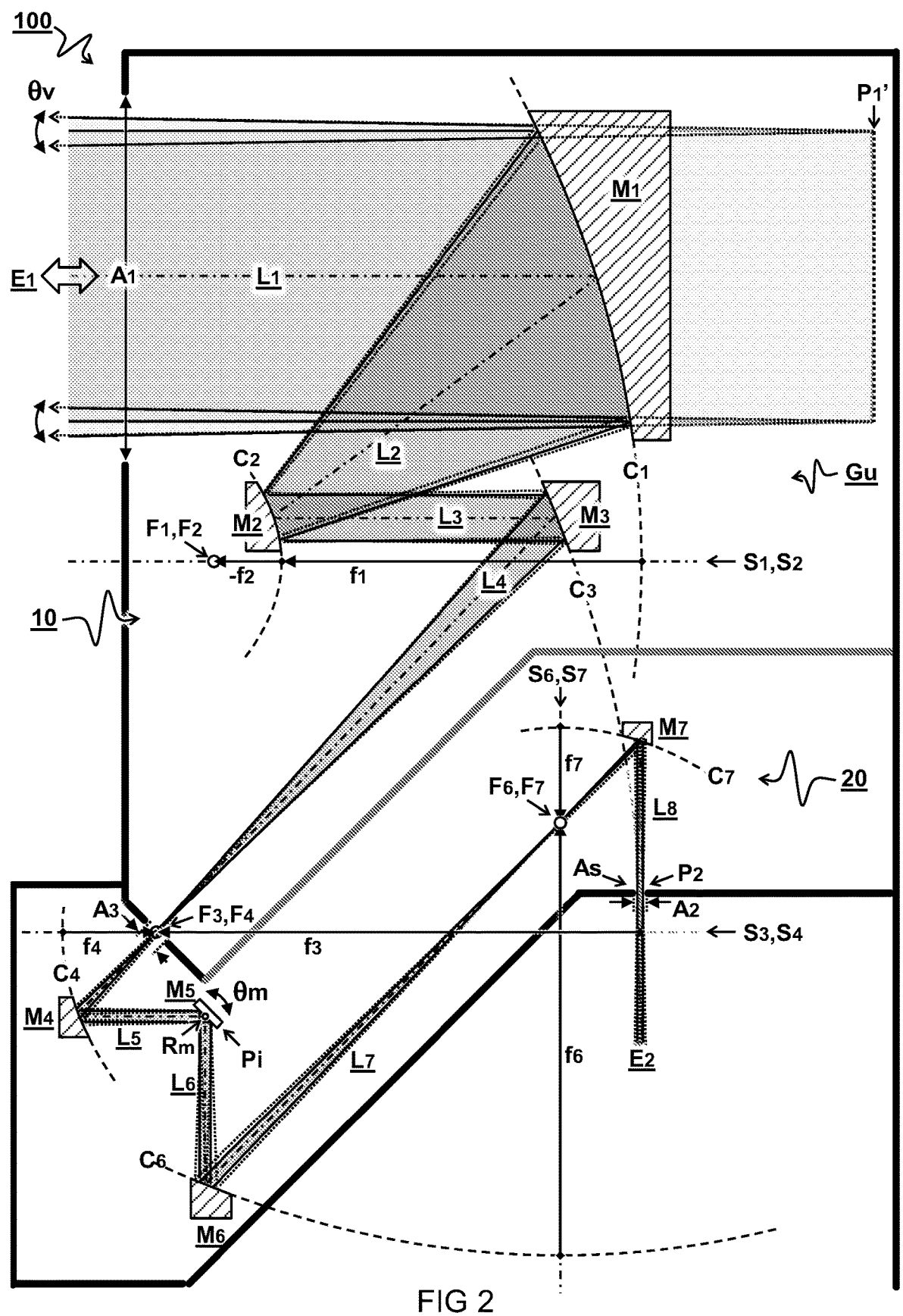
FIG. 2 schematically illustrates optical components in a telescope system.

FIG. 2 schematically illustrates further details of optical components configured to shape and guide light along an optical path inside a telescope system between and through its respective entrance and exit apertures.

In the embodiment shown, optical components M1-M7 are configured to shape and guide the light along an optical path L1-L8 inside the telescope system 100 between and through the respective entrance and exit apertures A1, A2. In the embodiment shown, a first part of the optical path L1-L5 is determined by a first subset of the optical components M1-M4 forming a first telescope stage 10 of the telescope system 100. In the embodiment shown, a second part of the optical path L6-L8 is determined by a second subset of the optical components M6-M7 forming a second telescope stage 20 of the telescope system 100. Also further optical stages can be provided (not shown).

Typically, the telescope system 100 has an aperture stop As, in this case determined by a minimum physical opening limiting light passing between and through the entrance and exit apertures A1, A2 of the telescope system 100 via the optical components along the optical path L1-L8. Preferably, as shown, a steering mirror M5 is arranged in a part of the optical path L5-L6 between the first telescope stage 10 and the second telescope stage 20 and configured to controllably rotate over a rotation angle θm for controlling a view angle θv of the telescope system 100 from the entrance aperture A1. Most preferably the steering mirror M5 is disposed at an intermediate pupil Pi of the telescope system 100, at which position an image of the aperture stop As is formed by one or more of the optical components, in this case mirrors M7, M6 making up the second telescope stage 20.

In a preferred embodiment, the optical components (exclusively) comprise mirrors. Alternatively, one or more lenses can be used to substitute one or more mirrors as the optical elements described herein (not shown). Even the steering mirror can in principle be replaced by a rotating refractive element, e.g. transparent plate. Also other optical elements can be part of the system, e.g. diffractive elements (not shown). In a most preferred embodiment, one or more, preferably all of the curved mirrors are parabolic mirrors, in particular rotation symmetric parabolic mirrors where each curvature "C" defines a respective focal point "F" and optical axis "A" formed by their rotational axis of symmetry. Typically, in a parabolic mirror, a point on the parabola that intersects the axis of symmetry is called the vertex and distance between the vertex and the focus "F", measured along the axis of symmetry "A", is referred to as the focal length "f" of the mirror. Using other curvatures for the mirrors, or e.g. lenses, corresponding focal lengths and axes of symmetry may be defined.

In a preferred embodiment, at least the first telescope stage 10 comprises a set of curved mirrors comprising at least one convex mirror (e.g. M2 in the embodiment shown) having a negative focal length (denoted f2<0). Most preferably, a sum of inverse focal lengths, (e.g. $1/f1+1/f2+1/f3+1/f4$) of the curved mirrors is zero (or close to zero). Such a configuration may allow to minimize image field curvature. This may provide particular synergy where the beam is allowed to move or rotate at the various optical elements as is the case here. Optionally, the second telescope stage 20 may have a similar configuration (not shown) where the set of mirrors have balanced power.

In a preferred embodiment, the first telescope stage 10 comprises at least three curved mirrors, most preferably an even number of mirrors, e.g. four, six, or eight. In some preferred embodiments, e.g. as shown, the first telescope stage 10 comprises a first set of curved mirrors, or similar optical elements, including at least a first curved mirror M1 having a first curvature C1 that is rotation symmetric around a first symmetry axis Si and defines a first focal point F1 at a first focal length f1, a second curved mirror M2 having a second curvature C2 that is rotation symmetric around a second symmetry axis S2 and defines a second focal point F2 at a second focal length f2, a third curved mirror M3 having a third curvature C3 that is rotation symmetric around a third symmetry axis S3 and defines a third focal point F3 at a third focal length f3, and a fourth curved mirror M4 having a fourth curvature C4 that is rotation symmetric around a fourth symmetry axis S4 and defines a fourth focal point F4 at a fourth focal length f4.

Figure 3:
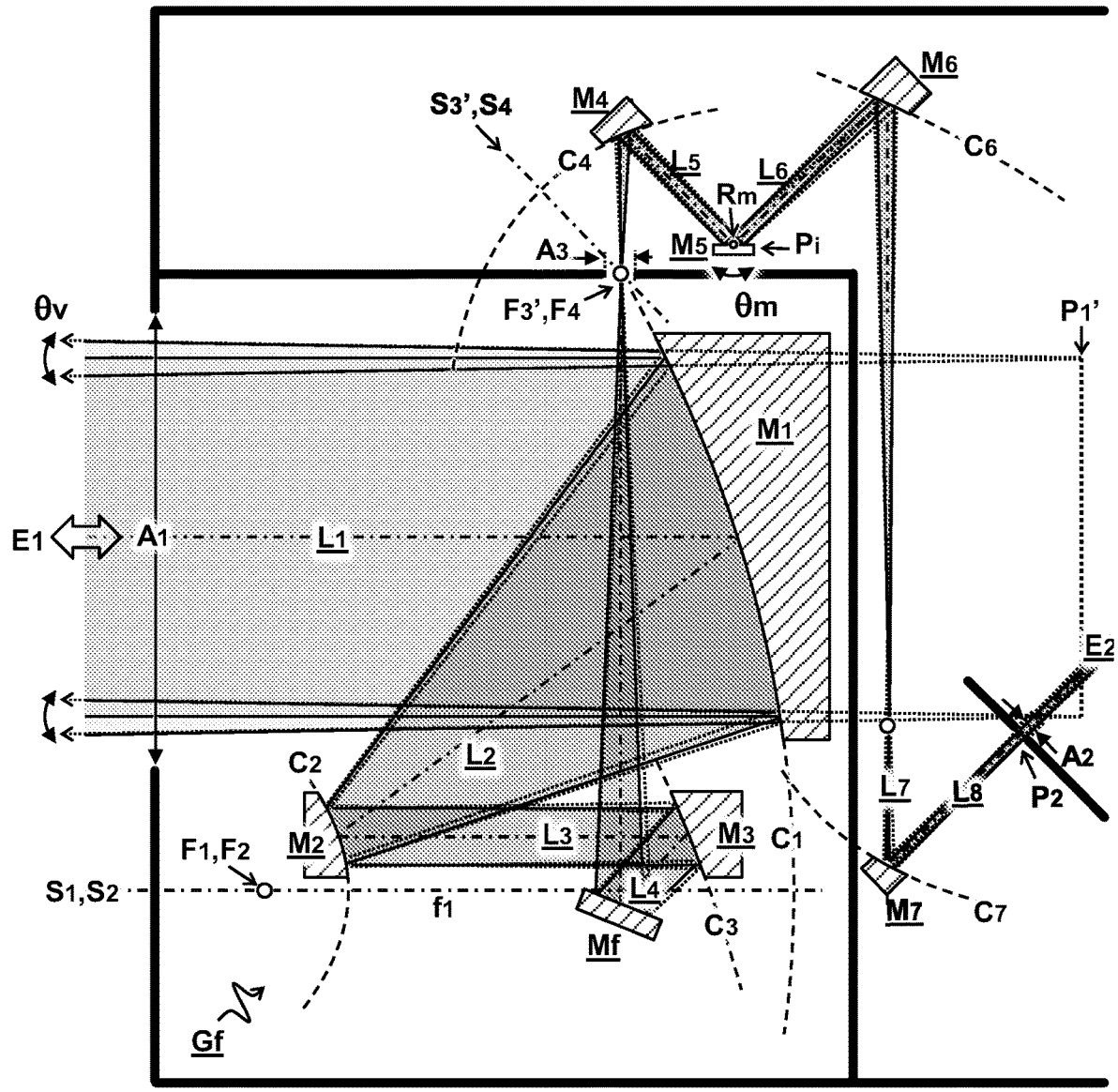
FIG. 3 illustrates a telescope system similar to FIG. 2 except using an optional folding mirror.

Optionally, one or more planar folding mirrors disposed in an optical path between any pair of the first set of curved mirrors M1-M4 to transform an otherwise unfolded geometry Gu into a corresponding folded geometry. For example, FIG. 3 illustrates a preferred embodiment, similar to the embodiment of FIG. 2 except that an optional (planar) folding mirror Mf is inserted in a part of the light path L4 between the third curved mirror M3 and fourth curved mirror M4 leading to an equivalent folded geometry Gf. It will be appreciated that this may lead to significant compactification of the design with minimal effect on its function. On the other hand, it will be noted, that the folding mirror Mf may cause an apparent displacement of the focal point F3' and optical axis S3' of the third curved mirror M3. This may obscure somewhat desired characteristics of overlapping certain points and axes as will be discussed hereafter. Therefore, in the following reference will be made to focal points and axes from a perspective of the unfolded geometry Gu as illustrated in FIG. 2 while it is understood that the same can be achieved in the corresponding folded geometry Gf of FIG. 3, or possibly other geometry with more folding mirrors.

In a preferred embodiment, as shown in FIGS. 2 and 3, at least from a perspective of the otherwise unfolded geometry Gu, the first focal point F1 coincides with the second focal point F2. In a further preferred embodiment, the third focal point F3 coincides with the fourth focal point F4. This may achieve that a collimated light beam at the entrance aperture A1 at L1 is re-collimated by the first pair of mirrors M1, M2. So the beam at L3 is also collimated before hitting the next pair of mirrors M3, M4. Similarly, the collimated beam at L3 is re-collimated by the second pair of mirrors M3, M4 before it arrives at L5, in this case hitting the steering mirror M5.

In a preferred embodiment, a first pair M1, M2 of optical components M1-M4 forming the first telescope stage 10 is configured to provide a magnification or demagnification between a factor one-and-half and five. For example, the (absolute) value of the first focal length f1 of the first curved mirror M1 is higher than that of the second focal length f2 by a factor between one-and-half and five. In some preferred embodiments, a second pair M3, M4 of the optical components M1-M4 forming the first telescope stage 10 is configured to provide a further magnification or demagnification between a factor one-and-half and five. For example, the (absolute) value of the third focal length f3 of the third curved mirror M3 is higher than that of the fourth focal length f4 of the fourth curved mirror M4 by a factor between one-and-half and five. Also more pairs of mirrors can be used, e.g. six, eight or more (not shown). Advantageously, the collimated beam may be magnified or de-magnified in two or more well controlled steps. Most preferably, the magnification or demagnification of each pair is at least a factor two. On the other hand if the factor is too high, it may be more difficult to control or prone to distortions, e.g. the factor may preferably be lower than five or lower than three for each stage of pair of mirrors.

In a preferred embodiment, at least from a perspective of the otherwise unfolded geometry Gu, the first symmetry axis Si coincides with the second symmetry axis S2. In another or further preferred embodiment, the third symmetry axis S3 coincides with the fourth symmetry axis S4. Advantageously, the angles of incidence may be the same or similar on both mirrors in each pair, and astigmatism may be compensated e.g. when combining two parabolic mirrors. Also more pairs of mirrors can be used where each respective pair has a coinciding symmetry axis.

Also in the second telescope stage 20 it is preferably to have at least one pair of optical elements, e.g. mirrors, with coinciding axes of symmetry S1, S7 and/or coinciding focal points F6, F7. In principle, the second telescope stage 20 may simply reimage with the same size the intermediate pupil Pi at the exit pupil P2, i.e. the exit aperture A2 acting as aperture stop As in this case. Preferably, the second telescope stage 20 may provide a further de-magnification of the (collimated) beam from the steering mirror M5 to the exit aperture A2. Accordingly, the beam may be reduced in size in at least three steps.

In one embodiment, e.g. as shown, the entrance aperture A1 is relatively large to accommodate the possibility of a moving light beam/view angle with respect to the virtual entrance pupil P1'. For example, the entrance aperture A1 is larger than a diameter of the incoming beam by a factor of at least 1.05 (~5% larger), preferably at least a factor 1.1, e.g. between 1.2 and two times larger. On the other hand, the opening is preferably not too large because this may allow contamination, e.g. dust to enter the optical system.

In one embodiment, e.g. as shown, the first telescope stage 10 is configured to provide a real focus in between the optical elements M1-M4. In the embodiment shown, a real focus F3=F4 is provided after the third mirror M3, which is preferred to a focus between the first two mirrors M1, M2 in some embodiments. A relatively small third aperture A3 may be arranged to coincide with the position of the real focus. The third aperture A3 may act as a field stop. Advantageously, the third aperture A3 or field stop may further act to separate a first compartment from a second compartment. In one embodiment, as shown, the optical component in the telescope system 100 are divided between at least a first compartment and a second compartment. Light may pass between the external surroundings or entrance side E1 and the first compartment via the entrance aperture A1. Light may pass between the first compartment and second apartment via a focus (here F3, F4) coinciding with a third aperture (e.g. A3). Preferably, the third aperture A3 has a smaller diameter than the entrance aperture A1 by at least a factor five, preferably at least a factor ten, more preferably, at least a factor twenty, or more. In a most preferred embodiment, the third aperture A3 forms the only physical opening between the first and second compartments. This embodiment may provide particular further advantage in combination with a de-magnifying telescope where the beam gets smaller between the first and second compartments. It will be appreciated that in the first compartment, the light beam diameter may be relatively large compared to the second compartment. By providing only a narrow opening between otherwise separate the compartments, contamination of e.g. space dust on the mirrors, can be avoided particularly where the beam is relatively small i.e. where the contamination would have more negative effect.

For the purpose of clarity and a concise description, features are described herein as part of the same or separate embodiments, however, it will be appreciated that the scope of the invention may include embodiments having combinations of all or some of the features described. For example, while embodiments were shown for a preferred arrangement of parabolic mirror, also alternative ways may be envisaged by those skilled in the art having the benefit of the present disclosure for achieving a similar function and result. E.g. optical components may be combined or split up into one or more alternative components, or further components such as folding mirrors can be added. The various elements of the embodiments as discussed and shown offer certain advantages, such as improved imaging through a telescope with variable view angle with minimal moving components. Of course, it is to be appreciated that any one of the above embodiments or processes may be combined with one or more other embodiments or processes to provide even further improvements in finding and matching designs and advantages. It is appreciated that this disclosure offers particular advantages to a pointing telescope system, and in general can be applied for any application wherein beams of light are variably redirected through an optical system.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:
1. A telescope system comprising:
an entrance aperture for allowing light to pass into the telescope system at an entrance side of the telescope system;
an exit aperture for allowing the light to pass out of the telescope system at an exit side of the telescope system;
optical components configured to shape and guide the light along an optical path inside the telescope system between and through the respective entrance aperture and the exit aperture, wherein a first part of the optical path is determined by a first subset of the optical components forming a first telescope stage of the telescope system, wherein a second part of the optical path is determined by a second subset of the optical components forming a second telescope stage of the telescope system, wherein the telescope system has an aperture stop determined by a minimum opening limiting light passing between and through the entrance and exit apertures of the telescope system via the optical components along the optical path; and a steering mirror arranged in a part of the optical path between the first telescope stage and the second telescope stage and configured to controllably rotate over a rotation angle for controlling a view angle of the telescope system from the entrance aperture, wherein the steering mirror is disposed at an intermediate pupil of the telescope system, at which position an image of the aperture stop is formed by one or more of the optical components there between, wherein the first subset of the optical components of the first telescope stage comprises a first set of curved mirrors, wherein the first set of curved mirrors comprises at least one convex mirror having a negative focal length, and wherein a sum of inverse focal lengths of the first set of curved mirrors is zero.

2. The telescope system according to claim 1, wherein the first set of curved mirrors comprises:
a first curved mirror having a first curvature that is rotation symmetric around a first symmetry axis and defines a first focal point at a first focal length,
a second curved mirror having a second curvature that is rotation symmetric around a second symmetry axis and defines a second focal point at a second focal length,
a third curved mirror having a third curvature that is rotation symmetric around a third symmetry axis and defines a third focal point at a third focal length, and
a fourth curved mirror having a fourth curvature that is rotation symmetric around a fourth symmetry axis and defines a fourth focal point at a fourth focal length.

3. The telescope system of claim 2 further comprising one or more planar folding mirrors disposed in an optical path between any pair of the first set of curved mirrors to transform an otherwise unfolded geometry into a corresponding folded geometry.

4. The telescope system according to claim 2, wherein from a perspective of the otherwise unfolded geometry, the first focal point coincides with the second focal point, and the third focal point coincides with the fourth focal point.

5. The telescope system according to claim 4, wherein the first set of curved mirrors in at least the first telescope stage are parabolic mirrors, wherein, from a perspective of the otherwise unfolded geometry, the first symmetry axis coincides with the second symmetry axis, and the third symmetry axis coincides with the fourth symmetry axis.

6. The telescope system according to claim 5, wherein the telescope system is an afocal system.

7. The telescope system according to claim 6, wherein the first telescope stage and the second telescope stage are both afocal systems.

8. The telescope system according to claim 7, wherein the first telescope stage is configured to de-magnify a collimated light beam from the entrance aperture to the steering mirror by at least a factor two,
wherein a first pair of the first subset of the optical components forming the first telescope stage is configured to provide a demagnification between a factor one-and-half and five; and
wherein a second pair of the first subset of the optical components forming the first telescope stage is configured to provide a further demagnification between a factor one-and-half and five.

9. The telescope system according to claim 1, wherein the aperture stop of the telescope system is determined by the exit aperture, wherein the second telescope stage is configured to image the exit aperture at the steering mirror.

10. The telescope system according to claim 1, wherein a center of the intermediate pupil coincides with a rotational axis of the steering mirror.

11. The telescope system according to claim 1, wherein a center of the intermediate pupil coincides with a front reflection surface the steering mirror.

12. The telescope system according to claim 1, wherein the steering mirror is configured to provide incidence and reflection angles less than forty degrees.

13. The telescope system according to claim 1, wherein the steering mirror is configured to allow a rotation angle over a limited range less than plus-minus three degrees.

14. A telescope system comprising:
an entrance aperture for allowing light to pass into the telescope system at an entrance side of the telescope system;
an exit aperture for allowing the light to pass out of the telescope system at an exit side of the telescope system;
optical components configured to shape and guide the light along an optical path inside the telescope system between and through the respective entrance aperture and the exit aperture, wherein a first part of the optical path is determined by a first subset of the optical components forming a first telescope stage of the telescope system, wherein a second part of the optical path is determined by a second subset of the optical components forming a second telescope stage of the telescope system, wherein the telescope system has an aperture stop determined by a minimum opening limiting light passing between and through the entrance and exit apertures of the telescope system via the optical components along the optical path; and
a steering mirror arranged in a part of the optical path between the first telescope stage and the second telescope stage and configured to controllably rotate over a rotation angle for controlling a view angle of the telescope system from the entrance aperture, wherein the steering mirror is disposed at an intermediate pupil of the telescope system, at which position an image of the aperture stop is formed by one or more of the optical components there between,
wherein the telescope system has at least a first compartment and a second compartment,
wherein light passes between an entrance side of the telescope system and the first compartment and via the entrance aperture,
wherein light passes between the first compartment and second apartment via a focus coinciding with a third aperture, and
wherein the third aperture has a smaller diameter than the entrance aperture by at least a factor ten.

15. An optical system for gravitational wave measurement in a space craft, the optical system comprising
at least one telescope system comprising:
an entrance aperture for allowing light to pass into the telescope system at an entrance side of the telescope system;
an exit aperture for allowing the light to pass out of the telescope system at an exit side of the telescope system;
optical components configured to shape and guide the light along an optical path inside the telescope system between and through the respective entrance aperture and the exit aperture, wherein a first part of the optical path is determined by a first subset of the optical components forming a first telescope stage of the telescope system, wherein a second part of the optical path is determined by a second subset of the optical components forming a second telescope stage of the telescope system, wherein the telescope system has an aperture stop determined by a minimum opening limiting light passing between and through the entrance and exit apertures of the telescope system via the optical components along the optical path; and a steering mirror arranged in a part of the optical path between the first telescope stage and the second telescope stage and configured to controllably rotate over a rotation angle for controlling a view angle of the telescope system from the entrance aperture, wherein the steering mirror is disposed at an intermediate pupil of the telescope system, at which position an image of the aperture stop is formed by one or more of the optical components there between;

a back-end optical device comprising an interferometer configured to interferometrically measure light beams traversing the at least one telescope system;

a reference mass disposed at a virtual entrance pupil of the at least one telescope system; and a controller configured to control the steering mirror to change the view angle of the at least one telescope system to receive or transmit the light beams to another optical system.

* * * * *